(12) United States Patent
Owen et al.

(10) Patent No.: US 7,297,284 B2
(45) Date of Patent: Nov. 20, 2007

(54) SEPARATOR FOR IMMISCIBLE LIQUIDS

(75) Inventors: Jonathan Owen, Merseyside (GB); John C. Sowerby, McKinney, TX (US); Douglas F. Samuelson, Frisco, TX (US)

(73) Assignee: Goslyn, L.P., Frisco, TX (US)

( * ) Notice: Subject to any disclaimer, the term of this patent is extended or adjusted under 35 U.S.C. 154(b) by 33 days.

(21) Appl. No.: 11/089,069

(22) Filed: Mar. 24, 2005

(65) Prior Publication Data

US 2005/0211620 A1   Sep. 29, 2005

Related U.S. Application Data

(60) Provisional application No. 60/556,832, filed on Mar. 26, 2004, provisional application No. 60/582,993, filed on Jun. 25, 2004.

(51) Int. Cl.
*B01D 17/025* (2006.01)

(52) U.S. Cl. ............. 210/800; 210/536; 210/537; 210/539; 210/540; 210/307

(58) Field of Classification Search ........... 210/800, 210/803, 521, 533, 536, 538, 539, 540, 532.1, 210/537, 299, 307
See application file for complete search history.

(56) References Cited

U.S. PATENT DOCUMENTS

| | | | | |
|---|---|---|---|---|
| 1,164,527 A | * | 12/1915 | Kelly, Jr. ............... | 210/540 |
| 2,284,737 A | * | 6/1942 | Hirshstein ............ | 210/539 |
| 2,826,306 A | * | 3/1958 | Burns .................. | 210/533 |
| 3,849,311 A | * | 11/1974 | Jakubek ............... | 210/539 |
| 3,971,719 A | * | 7/1976 | Peters ................. | 210/540 |
| 4,202,778 A | * | 5/1980 | Middelbeek .......... | 210/539 |
| 6,299,764 B1 | * | 10/2001 | White et al. ......... | 210/307 |
| 6,413,435 B1 | * | 7/2002 | Kyles et al. ......... | 210/540 |
| 6,517,715 B1 | * | 2/2003 | Batten et al. ........ | 210/532.1 |
| 6,951,615 B2 | * | 10/2005 | Tripodi et al. ....... | 210/540 |

FOREIGN PATENT DOCUMENTS

| | | |
|---|---|---|
| EP | 0890381 A1 | 1/1999 |
| EP | 0890381 B1 | 11/2003 |

* cited by examiner

*Primary Examiner*—Christopher Upton
(74) *Attorney, Agent, or Firm*—Anderson, Levine & Lintel (57) ABSTRACT

A separator provides improvements for better separation of an effluent into constituent parts and greater ease of use. A tapered basket provides improved flow and better filtration. A baffle directs effluent into the basket with greater force. An asymmetrical flange prevents mis-orientation the basket and baffle. An improved oil valve provides a locking mechanism to prevent dislodging of the valve during cleaning. An alternative valve uses a sensor to sense an oil/water interface and close the oil valve appropriately. A top seal prevents leakage of effluent at connection points with the lid of the housing. An underground unit allows below floor level installation of the separator. A bidirectional unit can be reversed to provide flow in either direction. A dual purpose tank can be used to store both separated oil and oil from operations for common removal.

10 Claims, 10 Drawing Sheets

→ TO OIL/GREASE CONTAINER 18

SEPARATOR FOR IMMISCIBLE LIQUIDS

CROSS-REFERENCE TO RELATED APPLICATIONS

This application claims the benefit of the filing date of now abandoned provisional application U.S. Ser. No. 60/556,832, filed Mar. 26, 2004, entitled "IMPROVED SEPARATOR FOR IMMISCIBLE LIQUIDS" and U.S. Ser. No. 60/582,993, filed Jun. 25, 2004, entitled "IMPROVED SEPARATOR FOR IMMISCIBLE LIQUIDS".

STATEMENT OF FEDERALLY SPONSORED RESEARCH OR DEVELOPMENT

Not Applicable

BACKGROUND OF THE INVENTION

1. Technical Field

This invention relates in general to a liquid separation devices and, more particularly, to a device for separating oils and/or grease from water.

2. Description of the Related Art

In several industries, and in particular the food industry, there is a need to separate liquid greases, fats and oils from waste water prior to passing the water to the sewage system. The waste water could be, for example, discharge from a washing device for cleaning dinnerware and cooking utensils. If the greases and fats solidify in the sewage system, a blockage can occur which is expensive to remediate.

Additionally, there is a movement in many localities to recycle grease and oils.

Figure 1A:
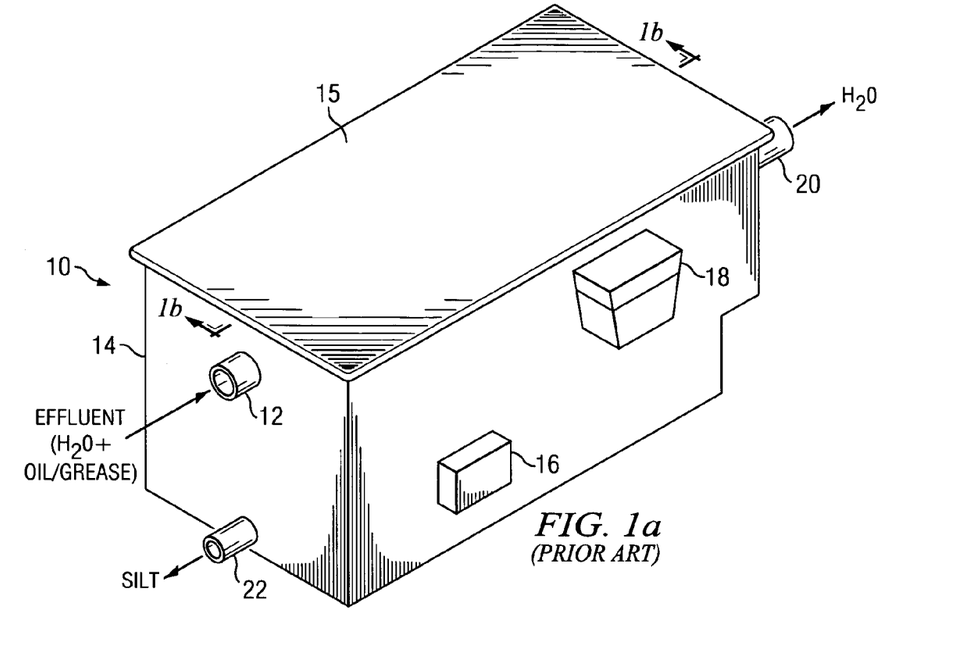
FIGS. 1a and 1b illustrate a perspective view and a cross-sectional view of a prior art separation device.
Figure 1B:
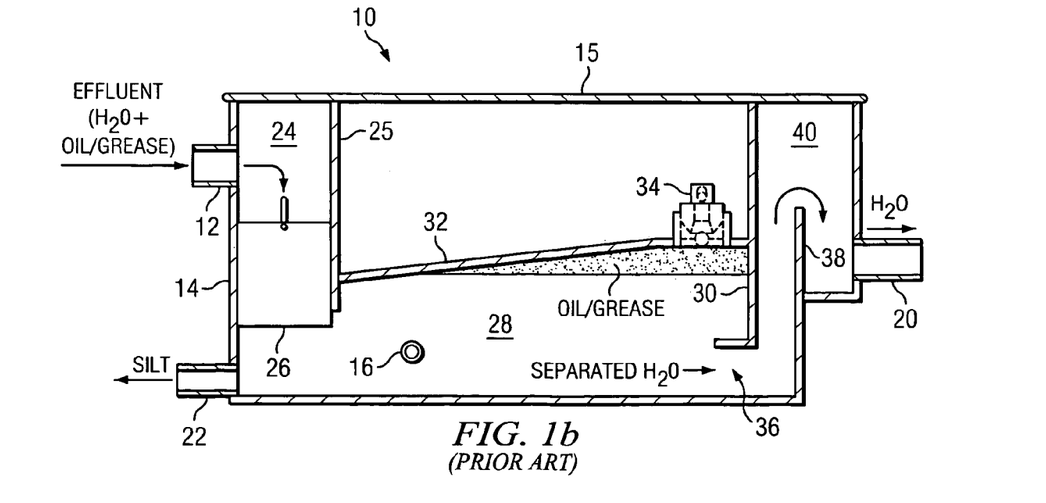

A commercially available separation device of the type described in European Patent EP 890381 B1 is shown generally in FIGS. 1a and 1b. FIG. 1a illustrates an exterior perspective view of the separation device 10. Effluent (containing two or more immiscible liquids of different densities, typically water entrained with oil, grease dissolved fats and other particles) is received at inlet 12 providing a passage into housing 14 (including removable lid 15). Effluent is heated using a probe-type heater 16, which is coupled to an electrical connection. As described below, the immiscible liquids separate within housing 14, and the less dense material (e.g., grease and oils) empties into container 18. The more dense liquid (e.g., water) is discharged from water outlet 20. Silt may accumulate at the bottom of housing 14. The silt may be periodically discharged through silt outlet 22.

Operation of the separation device 10 is described in greater detail in connection with FIG. 1b. FIG. 1b illustrates a cross-sectional side view of the separation device 10. A coarse filtration chamber 24 is defined between the housing 14 and control plate 25, which extends the full width of the housing. As effluent enters the coarse filtration chamber 24 through inlet 12, it passes through a filtering basket 26 (shown in greater detail in connection with FIG. 2), which filters out solid particles, such as undissolved fat and other food particles.

After passing through the basket 26, the effluent enters the separation chamber 28, defined by control plate 25, control plate 30 (which extends the full width of the housing), top plate 32 and the bottom of housing 14. There are two exits from the separation chamber: (1) through floating ball valve 34 and through passage 36, disposed between the bottom of control plate 30 and the bottom of the housing 14. Top plate 32 is angled upward from the bottom portion of control plate 25 towards control plate 30.

Weir plate 38, which extends the full width of the housing, defines a water (high density liquid) release chamber 40, along with control plate 30 and the housing 14. Outlet 20 is disposed through the housing.

In operation, as the effluent enters the separation chamber 28, the lower density liquid (grease/oil) rises. The flow through the separation chamber 28 is set at a rate that allows the lower density liquid to separate from the water and float upwards to the surface of the water, where it is contained below the sloping top plate 32.

The sloping top plate 32 forces the lower density liquid to accumulate at the entry to floating ball valve 34. Floating ball valve 34 is shown in greater detail in connection with FIG. 4. Floating ball valve 34 uses a ball that floats at the interface between the high density liquid and the low density liquid. When the high density liquid reaches a predetermined height, the ball rises to a height which stops flow from the separation chamber 28 to the container 18.

As the water flows through the separator 10, it must rise above the top of weir 38 in order to exit. Accordingly, the water in separation chamber 28 attempts to rise to approximately the same height. Since the top of the separation chamber 28 is below the top of weir plate 38, the hydrostatic pressure of the upward force of the water will push the separated grease/oil at the top of the separation chamber 28 through valve 34. The water, however, cannot pass through the valve 34, because the floating valve will stop its passage. Hence, once all the separated grease/oil is forced out of the separation chamber, the valve will remain closed until more grease/oil accumulates.

The separated water passes through passage 36, over weir plate 38 and out outlet 20. Silt in the water tends to accumulate at the bottom of housing 14, unable to rise over weir plate 38. Silt valve 22, located at the bottom of housing 14, can be opened periodically, and the flow of water out of the valve will flush out the silt.

In many fields of use for the separator 10, and in particular the food industry, it can be assumed that the employees who will operate and maintain the separator will be relatively transient between employers. Accordingly, aspects of the operation and maintenance of the separator must allow for unfamiliarity with details. Matters such as periodic cleaning of various components of the separator, such as the floating ball valve, if performed incorrectly, can lead to unwanted consequences, such as allowing water to exit into the oil/grease container or oil/grease flowing out of the outlet 20.

Also, it would be beneficial to improve the flow of liquids through the separation chamber, since oil and grease are by their nature sticky and tend to accumulate on hard surfaces.

Accordingly, there is a need in the industry for an improved separator.

BRIEF SUMMARY OF THE INVENTION

In one aspect of the present invention, a separator includes a tank having an inlet, an inlet chamber, a separation chamber and an outlet chamber, with the inlet feeding effluent into the inlet chamber, the inlet chamber being in communication with the separation chamber through a first passage and the separation chamber in being communication with the outlet chamber through a second passage. A basket having at least one tapered side disposed in the inlet chamber below the inlet, such that the one tapered side is disposed at an angle relative to an adjacent sidewall of the inlet chamber.

In another aspect of the present invention a baffle directs effluent into the basket with greater force.

In another aspect of the present invention, an asymmetrical flange prevents mis-orientation the basket and baffle.

In another aspect of the present invention the continuous seating and continuous flange on the basket prevents floatable solids bypassing the basket and floating up with the oil to interfere with the oil valve ball seating.

In another aspect of the present invention a self closing silt valve eliminates the chance of the silt valve being left open, which may cause the heater to overheat, burn out and cause smoking of the oil.

In another aspect of the present invention, an improved oil valve provides a locking mechanism to prevent dislodging of the valve during cleaning.

In another aspect of the present invention, a valve uses a sensor to sense an oil/water interface and close the oil valve appropriately.

In another aspect of the present invention, a top seal allows the incoming effluent to surcharge in the inlet chamber without leaking over connection points on with the lid of the housing.

In another aspect of the present invention, an underground unit allows below floor level installation of the separator.

In another aspect of the present invention, a bidirectional unit can be installed in such a way to allow flow in either direction, thus eliminating the need to manufacture and inventory units that flow either left-to-right or right-to-left.

In another aspect of the present invention, a dual purpose tank can be used to store both separated oil and oil from operations for common removal.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-11 of the drawings, like numerals being used for like elements of the various drawings.

Figure 2:
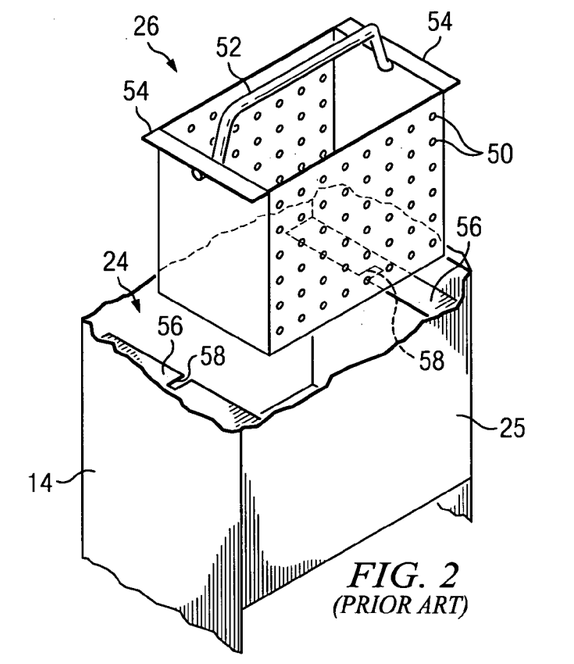
FIG. 2 illustrates a prior art filtration basket used in the device of FIGS. 1a and 1b.

FIG. 2 illustrates a prior art filtration basket 26. The basket has a front side (facing the housing at inlet 12) and a back side (facing control plate 25) that is perforated with holes 50, as is the bottom of the basket. Since the front side is relatively flush with housing 14 and the back side is relatively flush with control plate 25, and the ends are not perforated, almost all of the effluent flow is through the holes in the bottom of the basket. Over time, food particles will accumulate on the bottom of the basket 26, severely limiting flow into the separation chamber 28.

Other problems concern removal and replacement of the basket 26. The prior art uses a handle 52 which terminates through holes on either side of the basket. The basket 26 has flanges 54 on either side; flanges 54 normally rest on support clips 56 formed on either side of the housing in the coarse filtration chamber 24. In order to accommodate the exposed ends of the handle 52 when the basket is removed or replaced, slots 58 are formed in support clips 56 through which the ends of the handle may pass.

During operation, the slots 58 prevent a complete seal between flanges 54 and support clips 56. Some of food particle in the effluent may pass through the slots 58, bypassing basket 26. Food particles may also pass through the narrow gap between the front edge of the basket and the outer body 14 and the rear edge of the basket and the control plate 25. Excessive food particles entering the separation chamber 28 can clog the floating ball valve 34, resulting in water passing into the oil collection chamber 18.

FIGS. 3a through 3d illustrate perspective, top, cross-sectional front and cross-sectional side views of an improved basket 60. The improved basket increases efficient effluent flow, eliminates solid particles in the effluent from bypassing the filtration mechanism of the basket, and enhances effluent separation in the separation chamber 28.

As distinguished from the vertical sides of basket 26, tapered basket 60 has tapered sides that angle away from housing 14 and control plate 25. Further, all four sides are perforated. Accordingly, a larger surface area of the basket is separated from a constricting wall for more efficient flow through the basket 60. Since there is more area for holes 62, the holes 62 can have a smaller diameter, without affecting flow of effluent through the basket. In the prior art, holes 50 had a diameter of approximately 11/64 inches, while holes 62 can have a diameter of approximately 1/16 inches (0.15875 cm). This allows smaller particles to be trapped by the basket 60 for more effective coarse filtering. Further, more debris may be collected before the basket needs to be emptied, since the basket will continue to efficiently filter the effluent even when the bottom is covered.

An additional improvement is the addition of inclined baffle plate 64 to the basket 60. Baffle plate 64 deflects water from inlet 12 towards the bottom of the basket 60. A cut-out 64a in the baffle plate 64 faces inlet 12. As effluent enters the coarse filtering chamber 24, the baffle directs the effluent downwards to help drive oils and grease under the control plate 25. Further, as effluent hits the baffle plate 64, it is driven through a layer of oil, which helps to saturate the chemical emulsions, causing the emulsions to release the oil.

Figure 3A:
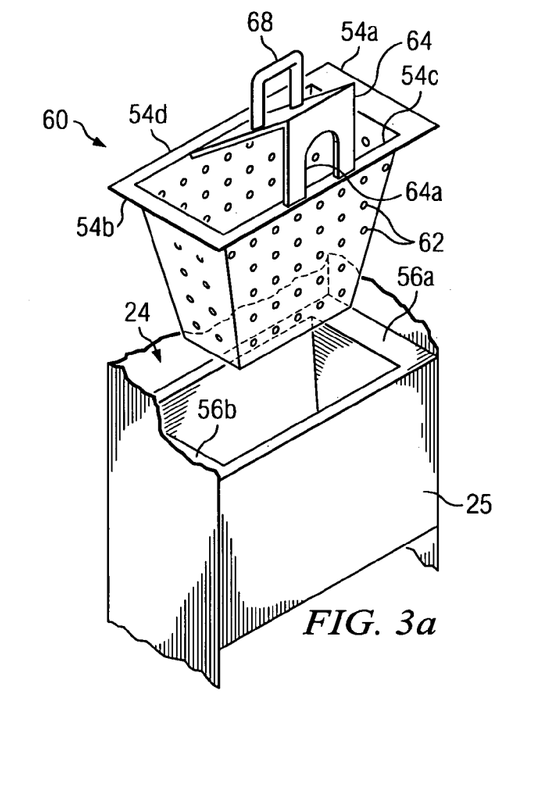
FIGS. 3a through 3d respectively illustrate perspective, top, cross-sectional front, and cross-sectional side views of an improved basket.
Figure 3B:
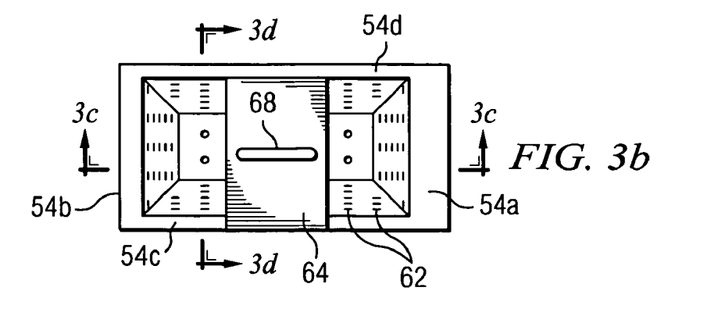
Figure 3C:
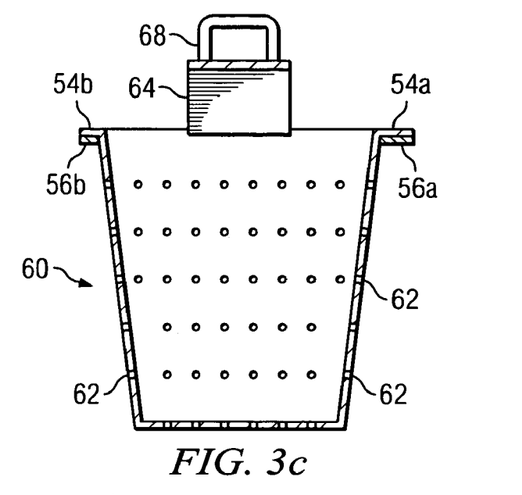
Figure 3D:
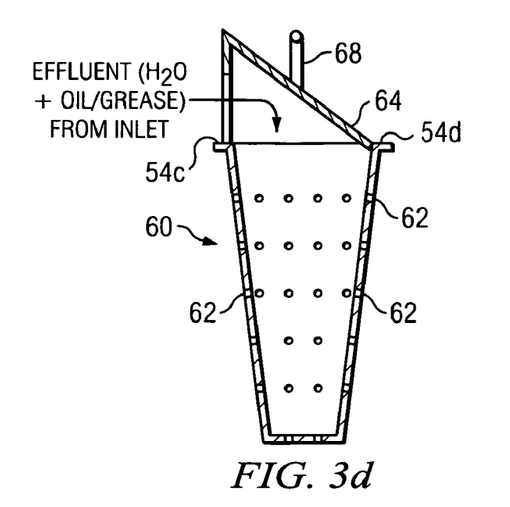

The handle 68 of basket 60 is attached to the top of the baffle plate 64. Because the handle does not protrude from the sides of the basket 60, the slots 58, shown in FIG. 2 are no longer necessary.

With the addition of the baffle plate 64, it is important that the basket 60 is oriented correctly (such that the baffle plate deflects effluent downward, not upward). A careless replacement of the basket 60 could thus cause problems with the operation of the separator 10. To prevent an errant replacement, the basket 60 has asymmetric flanges 54a and 54b. As shown in FIGS. 3a-d, flange 54a is wider than 54b, and support clip 56a is wider than 56b. If the basket 60 is replaced in the reverse orientation, the mismatch between the support clips 56a-b and flanges 54a-b will not allow the basket to seat properly (and the lid will not be able to close). This will notify the operator that the basket needs to be reversed. Front and back flanges 54c and 54d provide an integral lip that completely surrounds the basket 60 for a complete seal.

Figure 4:
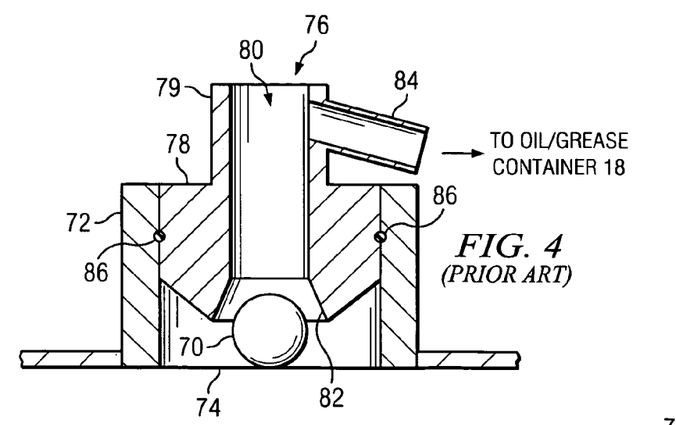
FIG. 4 illustrates a prior art floating ball valve used in the separation device of FIGS. 1a and 1b.

FIG. 4 illustrates a type of floating ball valve 34 used in the prior art. Floating ball valve 34 includes a ball 70 within housing 72. Ball 70 is held within housing 72 by a grid 74. Insert 76 includes a mating portion 78 for mating with the housing 72 above the ball 70 and an outlet portion 79 for communicating with the oil/grease container 18. A passage 80 is formed in insert 76 through the mating portion 78 and outlet portion 79, with a tapered opening 82 at the end of the passage 80. Passage 80 is coupled to outlet 84. O-ring 86 seals mating portion 78 and housing 72. As described above, the ball 70 is designed to float at the interface between two immiscible liquids (e.g., water and oil/grease). As the water rises, the oil/grease is pushed into passage 80, where it exits to the oil/grease container 18 via outlet 84. Once all of the lower density liquid (oil/grease) has been pushed into the passage 80, the ball 70 presses against the tapered opening 82, thereby closing the passage. In this way, only the lower density liquid can pass through the passage 80.

Since the oils and grease will pass through the passages 80 and 84 to the oil/grease container 18, the passages 80 and 84 need to be cleaned periodically to remove congealed substances. To do so, a brush is inserted into the passage 80 from above or passage 84 from the side and an up and down scrubbing motion is used to dislodge the congealed oil/grease within the passage 80. During the cleaning process, the mating portion 78 can easily become dislodged from the housing 72, causing failure of the valve 34.

Figure 5A:
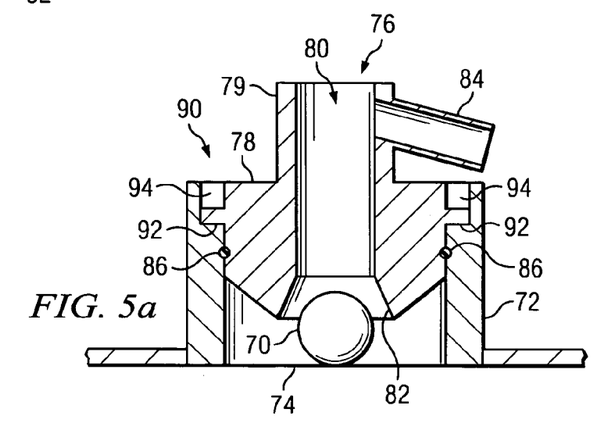
FIG. 5a illustrates a cross-sectional view of an improved floating ball valve.

In FIG. 5a illustrates a cross-sectional side view of an improved floating ball valve 90, which can be used in place of floating ball valve 34. Floating ball valve 90 includes a mating portion 78, with two protruding locking pins 92. Housing 72 includes two vertical channels 94 forming L-shapes with respective horizontal channels 96 (see FIG. 5b) to accept pins 92. The mating portion 78 is engaged within housing 72 by aligning the pin 92 with vertical channel 94, inserting the mating portion 78 into the housing 72 until pin 92 reaches the end of the vertical channel 94, then rotating the pin within the horizontal channel 96 to lock the mating portion within the housing 72.

Figure 5B:
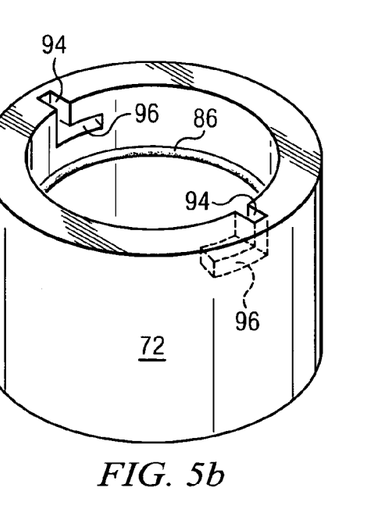
FIG. 5b illustrates a perspective view of a housing for an improved floating ball valve.
Figure 5C:
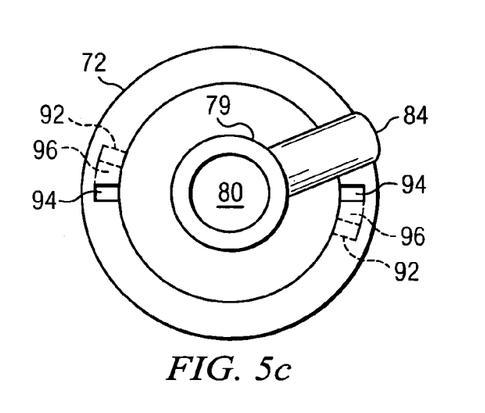
FIG. 5c illustrates a top view of the improved floating ball valve.

FIG. 5b shows a perspective view of housing 72, illustrating the vertical channel 94 and horizontal channel 96. FIG. 5c illustrates the insert 76 in a locked position within housing 72.

Another problem associated with floating ball valve 34 is the problems which can occur if the ball 70 sticks to the mating portion 82. This is possible because of the oil/grease that will coat both surfaces during normal operation of the separator 10.

Figure 6A:
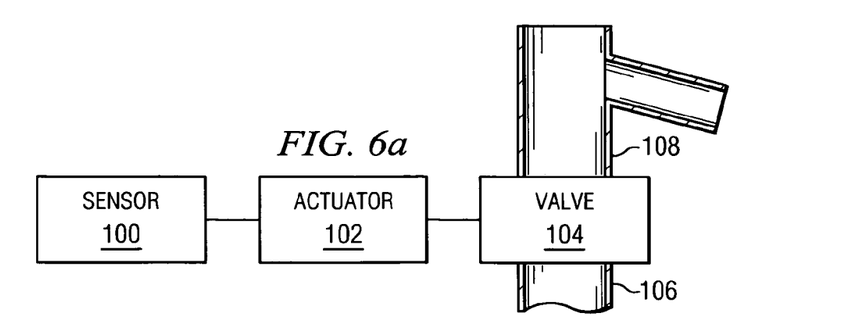
FIG. 6a illustrate a block diagram of an improved valve for replacing the ball valve of FIG. 4.

FIG. 6a illustrates a schematic of an alternative embodiment of a valve which can be used to eliminate the need for a floating ball. In FIG. 6a, a sensor 100 senses the location of the interface between the two immiscible liquids. When the interface has reached a predetermined level, the sensor sets a control signal to actuator 102. Responsive to the control signal, the actuator closes a valve 104 which controls flow between an oil/grease inlet 106 and an oil/grease outlet 108.

Figure 6B:
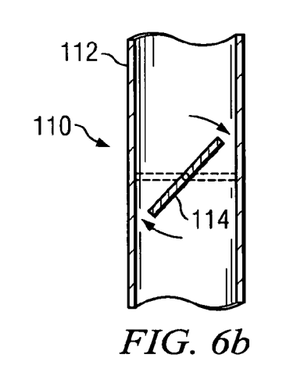
FIGS. 6b through 6d illustrate cross-sectional view of butterfly, gate and ball valves, respectively.
Figure 6C:
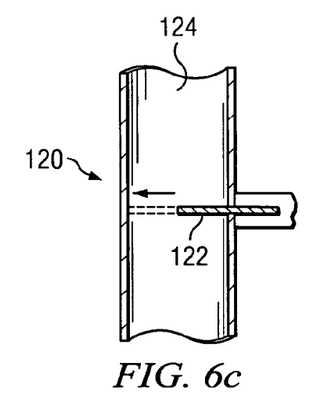
Figure 6D:
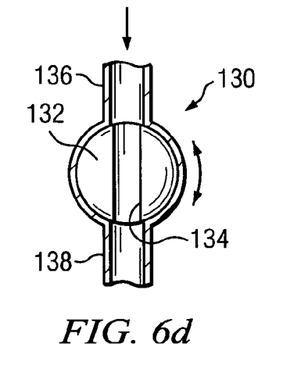

FIGS. 6b through 6d illustrate three types of valves that could used implement valve 104 (other valve types could be used as well). FIG. 6b illustrates a cross-sectional side view of a butterfly valve 110. The butterfly valve operates by rotating a disk 114 within cylindrical housing 112. When surface the disk 114 is aligned parallel to the axis of the cylindrical housing, the valve 110 is in an open state; when the surface of the disk 114 is perpendicular to the axis of the cylindrical housing 112, the valve 110 is in a closed state.

FIG. 6c illustrates a cross-sectional side view of a gate valve 120. In a gate valve, a gate 122 is positioned within tube 124 to prevent flow and withdrawn from tube 124 to allow flow.

FIG. 6d illustrates a cross-sectional side view of a ball valve 130 (not to be confused with the floating ball valve 34). The ball valve incorporates a sphere 132 with a cylindrical bore 134 disposed through the center of the sphere. When the bore is aligned with the inlet 136 and outlet 138, liquid can pass from inlet to outlet. When the bore 134 is rotated to a position where it does not communicate between inlet 136 and outlet 138, liquid can no longer pass through the valve.

The ball valve 130 is a preferred embodiment for the present invention, because the operation of the valve rotating between opened and closed positions tends to scrape away congealed oil/grease at the inlet and outlet. Therefore, this valve is somewhat self-cleaning.

Figure 7A:
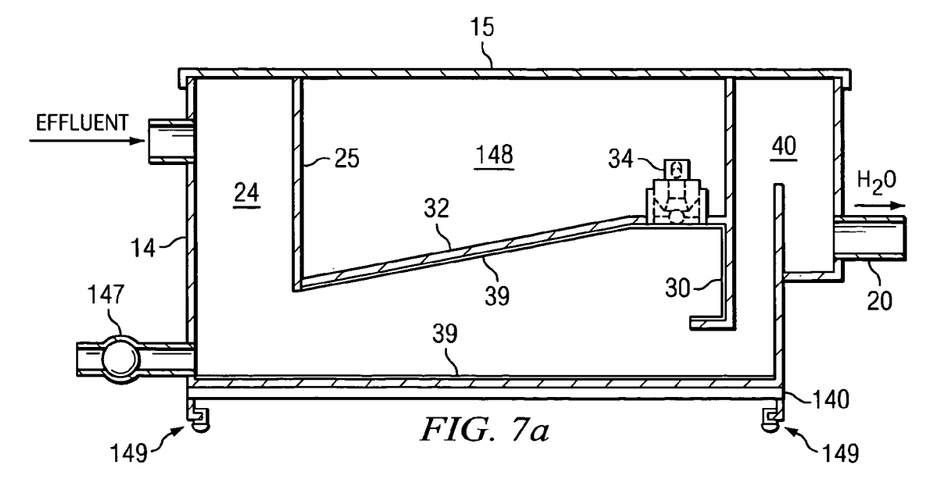
FIGS. 7a through 7c illustrates an improved separation device with low friction surfaces, improved heating and silt removal, and leakage prevention.

FIG. 7a illustrates improvements made to the separator 10 to improve flow of the liquids (and silt) inside the separation chamber for improved operation. First, the inside of housing 14 and surfaces of control plate 25, top plate 32, control plate 30 and weir 38 can be coated with a Teflon layer 39, or another non-stick coating layer 39, in improve flow and reduce friction and adhesion between the oil/grease/silt and these surfaces.

Additionally, FIG. 7a illustrates improvements made to heating of the liquids, particularly in the separation chamber 28. In the prior art, a probe-type heating element has been used. This presents several problems. First, the heater is mounted to the outside of the unit, where it can be inadvertently hit by employees, and knocked loose. Second, the surface area of the heater is relatively small and, therefore, the heat is localized.

In FIG. 7a, several alternatives are shown for heating the liquids in the separation chamber 28. These alternatives could be used separately or combined. The first alternative uses a heating blanket 140 disposed on the bottom of housing 14. This eliminates any protruding housing for the heater and heats a larger surface area, keeping the temperatures relative constant across the separation chamber 28.

A second alternative uses induction heating to heat the top plate 32 and/or valve 34. Since the top plate 32 and valve 34 are in nearly constant contact with the oil/grease, these elements can be heated by induction to most effectively provide heat for keeping the oil/grease as liquid as possible. The induction heating of the top plate 32 and/or valve 34 could be used in conjunction with the heat blanket 140.

Additionally, in FIG. 7a, a self-closing valve 147 is used as the silt valve. The valve 147 is held open manually long enough (generally about ten seconds) for the silt to be forced out by the pressure of water in the chamber and will close immediately the operator's hand is removed from the valve handle. This protects the device from being operated with the silt valve open, which could allow effluent to pass directly out the silt valve; this could cause the heater to overheat and to burn out and/or cause the oil to overheat and smoke.

Figure 7B:
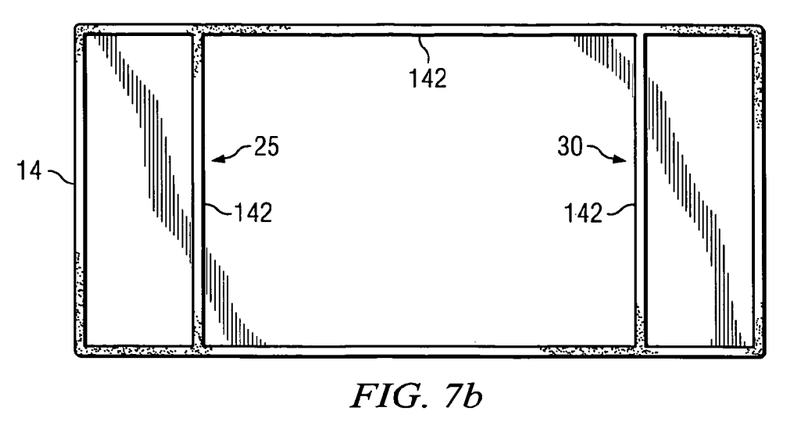
Figure 7C:
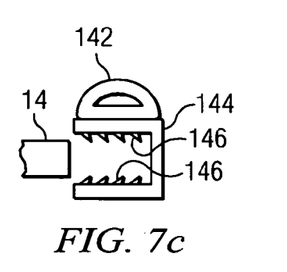

FIGS. 7a, 7b and 7c illustrate top and bottom seals used in the improved separator. A top seal 142 is formed on the perimeter of the housing 14 and on the tops of control plates 25 and 30, providing a continuous seal. In the preferred embodiment, the seal 142 is mechanically attached to the housing 14 and control plates in the manner shown in FIG. 7c. In FIG. 7c, the seal material, preferably in the form of a hollow neoprene tube or similar flexible hollow tubing, is affixed to an edge of the housing 14 and control plates 25 and 30 using a mechanical gripping mechanism 144. In the illustrated embodiment, the mechanical gripping mechanism includes teeth 146 which, when pushed onto the housing edges, will grab the edges to form a strong mechanical bond. Any gaps between strips of materials should be filled with a sealing compound.

In operation, the top seal 142 can withstand considerable water pressure with just the weight of the lid 15 maintaining contact with the seal 142. Thus, if an surge of water is received through inlet 20, water is maintained within the housing 14, and is kept from overflowing from either the coarse filtration chamber 24 or the water release chamber 40 into the interior chamber 148 of the housing 14, where it can become rancid.

Prior art mechanisms use a compressive foam that is affixed to the lower edge of the lid by means of a self adhesive strip, and a seal is created by the use of lid clamps to hold the lid to the body. The claims make the user access to the unit difficult. Also, the clamped lid discourages the operators from properly maintaining the unit.

An additional bottom seal 149 is affixed around the bottom edge of the housing 14. Once again, the bottom seal 149 is preferably in the form of a hollow neoprene tube affixed to the edges of the housing 14 using a mechanical gripping mechanism 144 as shown in FIG. 7c.

Prior art methods for sealing the separator to a floor, such as by caulking, have adhesion problems, particularly in the grout lines. Since units will often be retrofit to existing restaurants, the grease embedded in the grout resists adhesion, allowing water from floor cleaning to seep under the unit. Also, caulking complicates moving of the unit. Placing the unit on legs such that the floor can be cleaned under the unit can add height to the unit, reducing the positive fall of the effluent from sink and dishwasher drains.

The bottom seal 149 has been shown to effectively seal the unit to the floor, and is particularly effective in sealing the grout lines, since the weight of the unit holds the bottom seal 149 firmly within the grout lines.

Figures 8, 9:
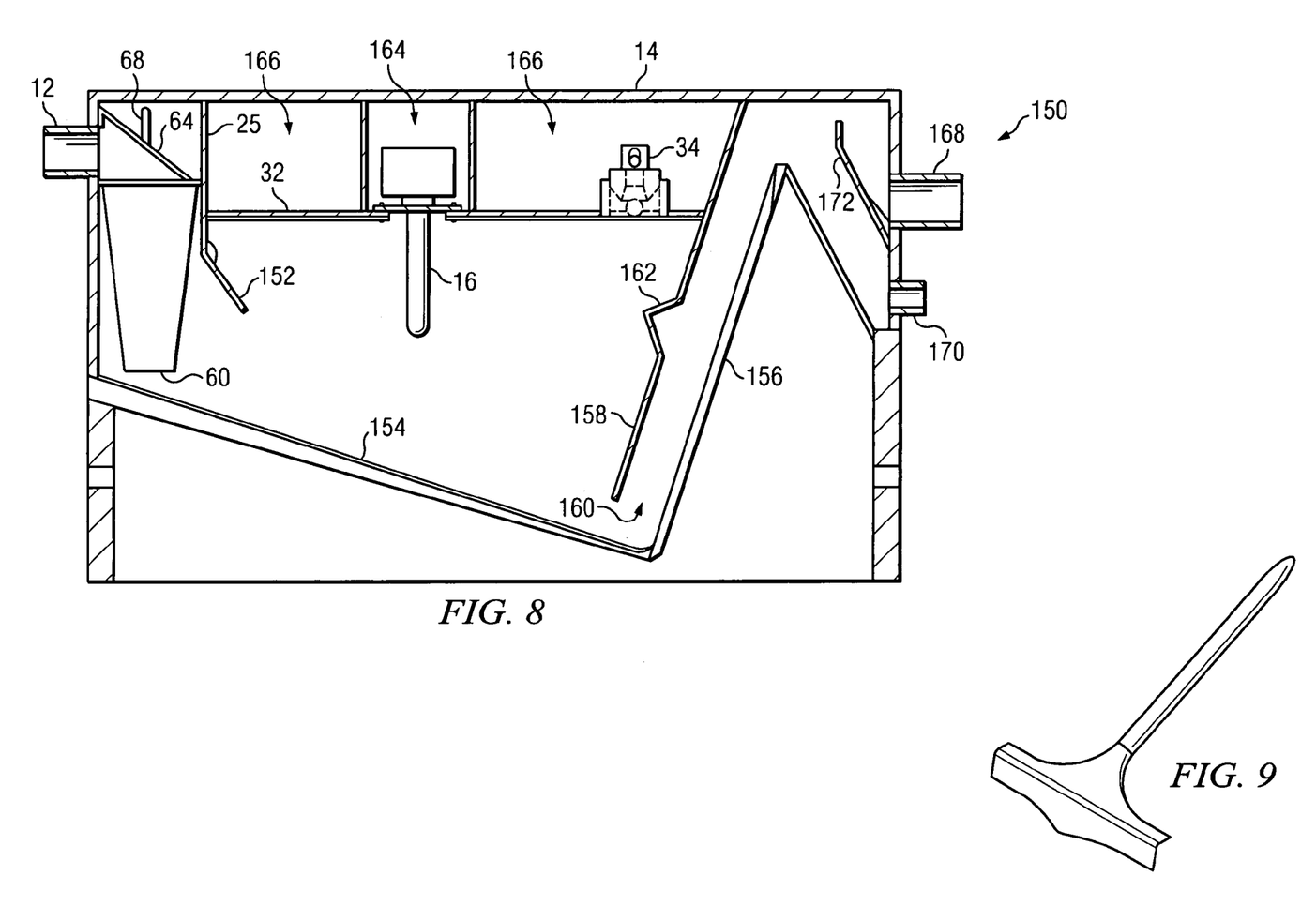
FIG. 8 illustrates an improved separation device that can be used in an in-ground installation.
FIG. 9 illustrates a tool for cleaning the separation device of FIG. 8.

FIG. 8 illustrates an embodiment of a separator 150 which has the advantage that it can be used in an in-ground embodiment. For illustration purposes, separator 150 is shown with the prior art heater 16 and floating ball valve 34, it being understood that the other improvements described herein could be used in the place of these elements.

In FIG. 8, basket 60 performs coarse filtering on effluent received through inlet 12. Control plate 25 has an angled portion 152 to provide an improved flow through basket 60 (this improvement can be used in other configurations as well). A downward sloping bottom control plate 154 has a V-shape (or channel) to catch silt, and is preferably Teflon coated. The V-shape bottom control plate transitions into weir 156, maintaining a V-shape which is slanted upwards to the desired predetermined height to provide hydrostatic pressure on the separated oil at valve 34. Control plate 158, is coupled to the top of housing 14 and provides a channel 160 through which the separated water flows. Control plate 158 includes an enlarged portion 162. Heater 16 is disposed through top plate 32, within compartment 164. Apart from compartment 164, the area above top plate 32 can be used as a sump 166 to store oil/grease from oil/grease valve 34, preferably in a removable container. Access to the tapered basket 60, sump 166, compartment 164 and oil valve 34 can be made by removing one or more lids (not shown) on the top of housing 14. If silt is to be separate from the water, a water outlet 168 is placed above a silt valve 170. Alternatively, a single outlet can be provided, which disposes of both water and silt. A mesh screen 172 is positioned in front of water outlet 168 to filter out silt.

In operation, silt from the effluent will gather at the bottom plate 154, and will be drawn towards the lowest portion of the "V" shaped plate 154 at the interface with the weir 156. The flow of water through channel 160 will push the silt up the channel 160. The enlarged portion 162 of the channel will create turbulence and additional suction to pull silt up and over the top of weir 156. Silt will fall to silt valve 170, which can be periodically opened to a silt outlet or collected separately in a container coupled to the silt valve 170. The remainder of the water flows out of water outlet 168 into the sewage system.

Over time, some silt may collect on weir 156. FIG. 9 illustrates a scraper which matches the profile of weir 156 to remove this silt.

Preferably, all inside surfaces of separator 150 are Teflon coated to decrease resistance and improve flow.

Figure 10:
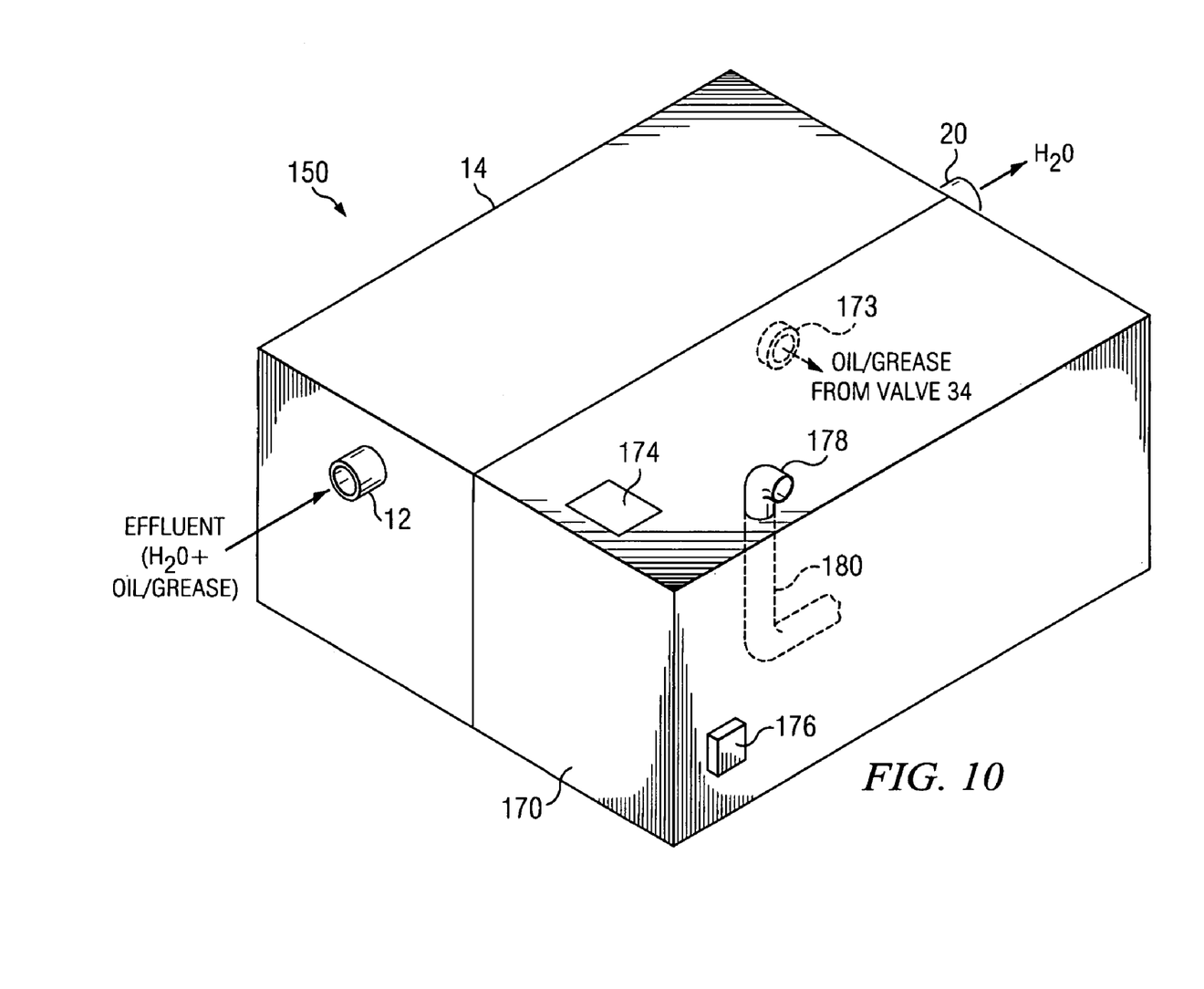
FIG. 10 illustrates a separation device combined with a large capacity storage container for unified grease control.

FIG. 10 illustrates a diagram of a separator with a large grease container for containing both grease/oil separated from the effluent and for containing used grease/oil from operations, such as from frying machines. In this embodiment, an underground separator 150 (an above ground separator of the type shown in FIGS. 1-7a-c could also be used) is coupled to a storage tank 170 which is large enough to hold all the discard oil/grease from effluent and operations. Pipe 173 couples the valve 34 to the storage tank 170. Opening 174 allows workers to pour the oil/grease into the storage tank from an oil caddy, for example. Alternatively, the oil/grease from operations could be pumped directly to the tank 170. Heater 176 heats the contained oil so that it does not solidify. Valve 178, typically a quick disconnect valve, provides a suitable connection to an oil pump used to pump oil/grease from the tank 170 for reclamation. Pipe 180 is disposed between valve 178 and the bottom of the tank 170.

In operation, the embodiment shown in FIG. 10 allows a business to consolidate all oil/grease waste for removal by a collection company, typically an outside contractor or municipality. The unified design allows the collection company to collect all of the used oil/grease from a restaurant. By using the underground configuration, oil drums/dumpsters could be eliminated from the back of the restaurant, or other business.

Figure 11:
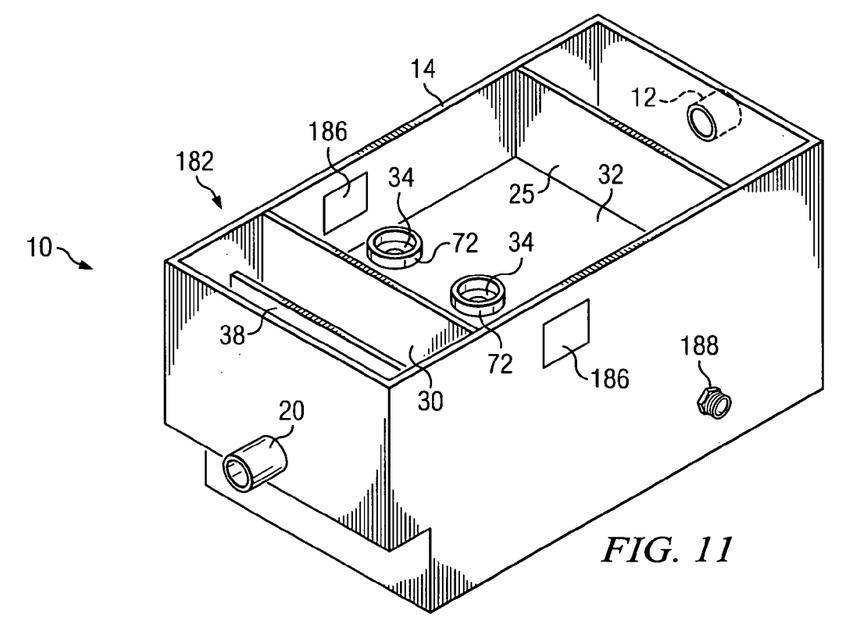
FIG. 11 illustrates a bi-directional separation device.

FIG. 11 illustrates an embodiment for an above-ground bidirectional separator 182 (with lid 15 removed), i.e., the valve 34 and heater 16 can be located on either side of the housing 14. The housing 14 includes two oil valve housings 72, one of which will receive a valve 34 and the other of which will have a plug installed. Container 18 is mounted through opening 186 on the side of the valve 34, the other opening 186 is closed with a blank. The holes 186 have slotted holes adjacent to them to enable either the container 18 or support or blank plate to be mounted. Threaded connections 188 are made on either side of the housing 14 for receiving the heater 16; the side not receiving the heater is closed with a threaded plug.

The embodiment shown in FIG. 11 allows the separator 182 to be installed in either flow direction, which reduces the cost of inventory that must be maintained and allows the most efficient installation within a business. Further, the direction of the separator 182 can be switched if a kitchen is remodeled (on average, a commercial kitchen is remodeled every five years) to accommodate a change in flow through the pipes.

Figures 12, 13A, 13B:
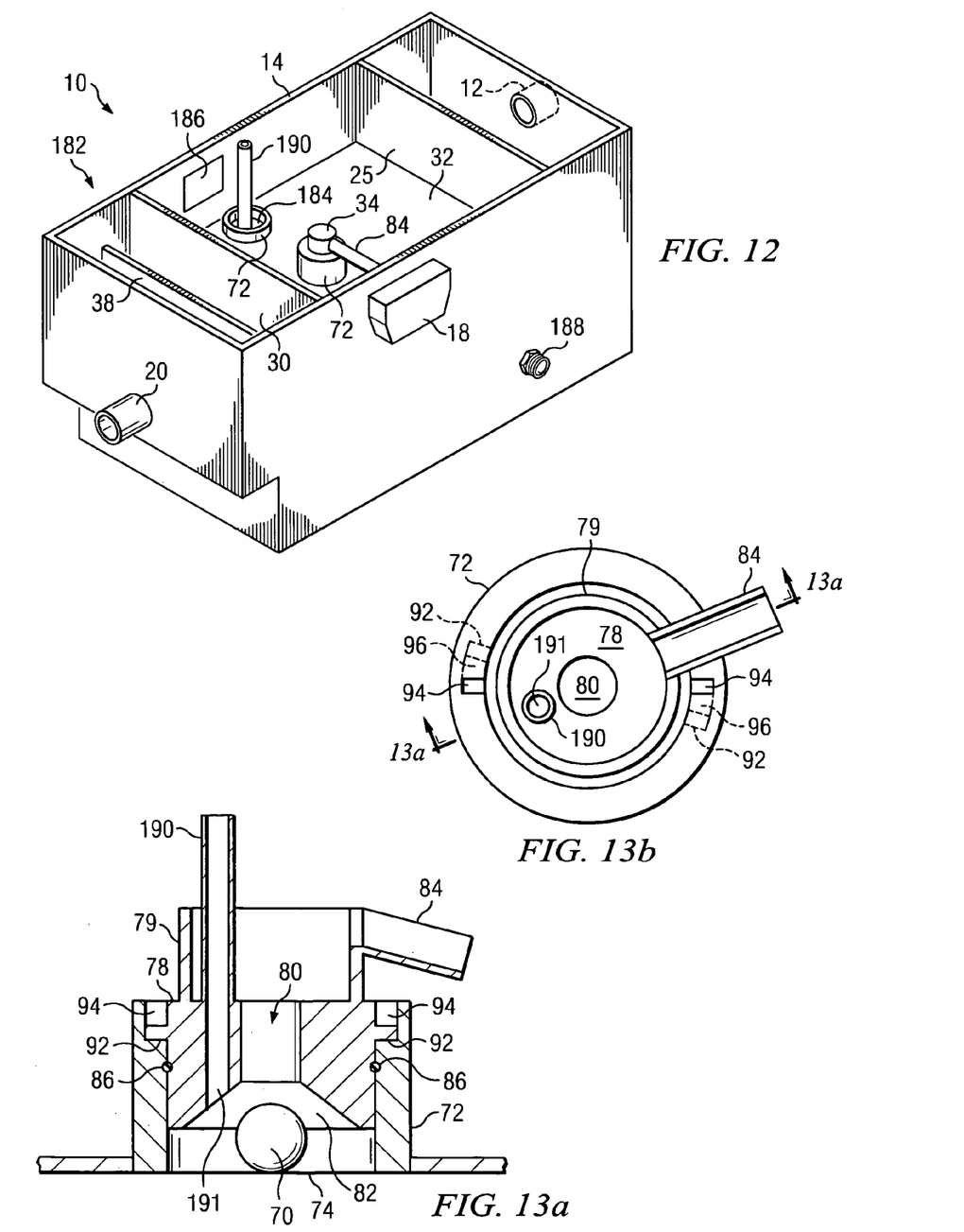
FIG. 12 illustrates an embodiment using a breather tube for eliminating trapped air in the separation chamber.
FIGS. 13a and 13b illustrate a cross-sectional side view and a top view, respectively, of an embodiment of a ball valve with an integral breather tube.

FIG. 12 illustrates an embodiment for eliminating trapped air in the separation chamber 28. In certain circumstances, such as startup, a rush of effluent with entrained air bubbles into separation chamber 28 can cause the ball 70 to stick against tapered opening 82 (see FIG. 5a). As the entrained air bubbles separate from the effluent, they can hold the ball 70 against the tapered opening 82 causes the valve to remain closed. Daily cleaning of the valve has been found to reduce the problem, but as the entrapped air in the separation chamber 28 escapes through the valve, it propels the oil/grease in the valve at the person cleaning the valve.

In FIG. 12, a breather tube 190 is in communication with the separation chamber 28 (in the illustrated embodiment, the breather tube 190 is disposed through the unused valve housing 72, however it could be disposed through any suitable part of top plate 32). The breather tube 190 extends to near the lid 15, such that hydrostatic pressure cannot force oil/grease out of the breather tube 190. Alternatively, the breather tube 190 could feed into the ball valve, such that any oil/grease emitted from the breather tube 190 would be fed into the container 18.

In operation, since the breather tube communicates directly with the separation chamber 28, without a ball valve to interrupt communication, air can always pass out of the separation chamber through the breather tube 190 and therefore, the air will not cause the ball valve to close improperly.

It should be noted that animal fats may solidify in the breather tube 190. Accordingly, the breather tube 190 should be kept hot by electrical trace and insulation, or by other methods.

FIGS. 13a and 13b illustrate a cross-sectional side view and a top view, respectively, of an embodiment of a ball valve 34 with an integral breather tube 190. In this embodiment, a breather tube hole 191 is formed through mating portion 78, with the tube 190 extending upwards from hole 191 to a level near lid 15, or other level that will ensure that hydrostatic pressure will not force oil/grease out of the breather tube 190. Additionally, FIGS. 13a and 13b illustrate outlet 84 as a trough, rather than a pipe. A trough configuration is generally easier to clean, and uses less material.

Figure 14:
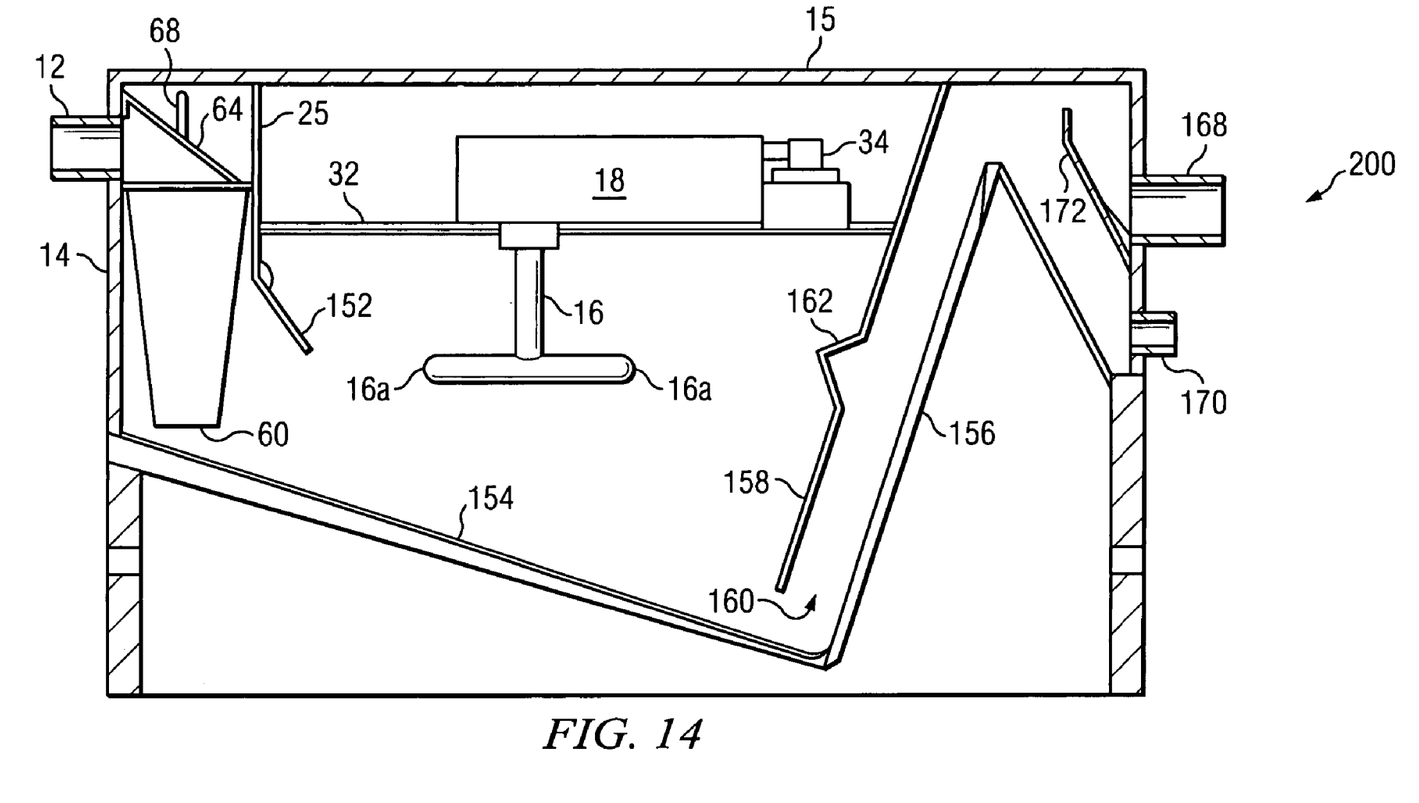
FIG. 14 illustrates another embodiment of an in-ground separator 200.

FIG. 14 illustrates another embodiment of an in-ground separator 200. This embodiment is similar to the embodiment of FIG. 8, with the container 18 locate above top plate 32, such that it can be accessed by removing lid 15. Heater 16 is located below top plate 32 and has extended portions 16a to provide additional surface area for heating the effluent. The operation of the separator 200 is the same as described above.

This embodiment provides an in-ground separator that can be used, for example, inside a restaurant work area. The container can be easily accessed and removed for transporting the oil/grease to a storage container.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

The invention claimed is:

1. A separator for immiscible liquids comprising:
   a tank having an inlet, an inlet chamber, a separation chamber and an outlet chamber, with the inlet feeding effluent into the inlet chamber, the inlet chamber being in communication with the separation chamber through a first passage and the separation chamber in being communication with the outlet chamber through a second passage, wherein effluent separates into a denser fluid and a less dense fluid in the separation chamber;
   a valve disposed in the separation chamber for passing the less dense fluid and preventing the denser fluid from passing, where the valve is opened or closed responsive to a floating member which rises or falls with the separated effluent to open or close the valve;
   an opening for passing gas from the separation chamber while the valve is closed; and
   a storage tank for storing the less dense fluid from the valve.

2. The separator of claim 1 wherein said opening is formed integrally with the valve.

3. The separator of claim 1 wherein the opening comprises a tube in communication with the separation chamber.

4. The separator of claim 1 and further comprising a basket having at least one tapered side disposed in the inlet chamber below the inlet, such that the one tapered side is disposed at an angle relative to an adjacent sidewall of the inlet chamber.

5. The separator of claim 1 wherein said valve is replaceably disposed in one of a plurality of valve housings coupled to said separation chamber, said valve having an interlocking connection to the valve housing.

6. The separator of claim 1 and further comprising an automatically-closing silt valve located proximate a lower surface of the tank for removing silt when open.

7. The separator of claim 1 wherein said storage tank comprises a removable storage tank.

8. A method of separating a less dense fluid from a denser fluid from effluent, comprising the steps of:
   passing effluent through a tank having an inlet, an inlet chamber, a separation chamber and an outlet chamber, with the inlet feeding effluent into the inlet chamber, the inlet chamber being in communication with the separation chamber through a first passage and the separation chamber in being communication with the outlet chamber through a second passage, wherein effluent separates into a denser fluid and a less dense fluid in the separation chamber;

passing the less dense fluid through a valve disposed in the separation chamber, where the valve includes a floating member which rises or falls to open or close the valve;

passing gas through an opening in the separation chamber while the valve is closed; and storing the less dense fluid from the valve into a storage tank.

9. The method of claim 8 wherein the step of passing gas through an opening comprises the step of passing gas through an opening formed integrally with the valve.

10. The method of claim 8 wherein the step of passing gas through an opening comprises the step of passing gas through a tube in communication with the separation chamber.

* * * * *